United States Patent [19]

Soechtig

[11] Patent Number: 4,854,713
[45] Date of Patent: Aug. 8, 1989

[54] IMPINGEMENT MIXING DEVICE WITH PRESSURE CONTROLLED NOZZLE ADJUSTMENT

[75] Inventor: Wolfgang Soechtig, Germering, Fed. Rep. of Germany

[73] Assignee: Krauss-Maffei A.G., Fed. Rep. of Germany

[21] Appl. No.: 119,127

[22] Filed: Nov. 10, 1987

[51] Int. Cl.$^4$ ............................................. B01F 15/02
[52] U.S. Cl. .................................... 366/132; 137/563; 137/606; 366/134; 366/137; 366/159; 366/177; 422/111; 422/133
[58] Field of Search .............. 366/159, 134, 137, 136, 366/173, 177, 189, 132, 268, 604; 422/111, 112, 133; 425/4 R, 155; 137/115, 563, 606, 625.4, 637

[56] References Cited

U.S. PATENT DOCUMENTS

| | | |
|---|---|---|
| 1,735,718 | 4/1925 | Attendu . |
| 3,706,515 | 12/1972 | Keuerleber et al. . |
| 3,788,337 | 1/1974 | Breer . |
| 3,924,651 | 12/1975 | Hippel et al. . |
| 3,926,219 | 12/1975 | Ersfeld et al. . |
| 4,076,210 | 2/1978 | Spielvogel . |
| 4,105,045 | 8/1978 | Althausen et al. . |
| 4,175,874 | 11/1979 | Schneider . |
| 4,239,732 | 12/1980 | Schneider . |
| 4,378,335 | 3/1983 | Boden et al. . |
| 4,389,375 | 6/1983 | Proksa et al. ........................ 422/111 |
| 4,399,104 | 8/1983 | Coblene et al. ...................... 422/111 |
| 4,592,657 | 6/1986 | Taubenmann ....................... 366/134 |

FOREIGN PATENT DOCUMENTS 0225604 12/1986 European Pat. Off. .

Primary Examiner—Timothy F. Simone
Attorney, Agent, or Firm—Robert J. Koch

[57] ABSTRACT

A closed loop feedback control for a high pressure impingement mixing system. The high pressure impingement mixing device is equipped with a circulation loop containing both a pressure sensor and a flow volume meter. Constant pressure and flow volume is acheived by continuous closed feedback loop monitoring of the pressure and flow volume to effect a change in an adjustable pump setting and servo displaceable nozzle needle. The nozzle needle adjustment allows maintaining the appropriate pressure and volume on a continuous spaces. It also allows altering component ratios and/or flow volumes during a shot in order to affect a change in material or flow characteristics of a produced part.

7 Claims, 7 Drawing Sheets

IMPINGEMENT MIXING DEVICE WITH PRESSURE CONTROLLED NOZZLE ADJUSTMENT

BACKGROUND OF THE INVENTION

1. Field of the Invention

The invention relates to impingement mixing devices and particularly to pressure control adjustments in impingement mixing devices.

2. Description of the Related Technology

Impingement mixing devices are utilized for mixing two or more components by high pressure impingement in a contained area or mixing chamber. Impingement mixing devices are particularly useful for production of polyurethane by the reaction of polyol and poly-isocyanate. Other plastic materials may also be produced in impingement mixing devices such as polyureas, nylons, polyesters, and the like. In order to achieve appropriate conditions for a reaction these components must be intimately mixed. This mixing may be achieved by high pressure impingement in a mixing head. U.S. Pat. Nos. 3,706,515 and 4,175,874, the disclosures of which are incorporated herein by reference, disclose high pressure impingement mixing heads which may be utilized in the present invention.

Prior high pressure impingement mixing heads utilize a control piston which regulates a switch over between component recirculation and component mixing phases. The high pressure mixing heads exhibit infeed ducts which contain input nozzles for introduction of the components into a mixing chamber. Input nozzles include a nozzle needle which defines an annular gap. The nozzle needle may be manually moved to set the annular nozzle gap. The setting of the nozzles sets the cross-sectional area of the inlet ports and therefore has a large effect on the impingement pressure of the components.

During production of polyurethane parts it is important that impingement pressure be controlled. Small changes in impingement pressure can have significant effects on the quality of parts produced. Disturbances factors such as differing material viscosities, nozzles needle wear, and thermal expansion of needles has an effect on the processing pressure and, thus, on the production result. In prior production processes pressure was only corrected after an operator noticed a decrease in article quality, i.e., when a large portion of produced parts were rejected.

SUMMARY OF THE INVENTION

It is an object of the invention to provide an impingement mixing apparatus which continuously monitors component pressure and automatically adjusts the nozzles needle gap in order to maintain the appropriate pressure. The nozzle needle gap can be adjusted by axially adjusting the nozzle needle position. The axial movement of the nozzle needles can overcome the effects of changes in the pressure due to thermal expansion of the impingement components, built-up residue, deterioration of the nozzles, or a partial blockage of the impingement port.

The interaction between volume and pressure of each component further enables changing the component mixing ratio by affecting the pressure of only a single component or by modification of the component pressure of each component independent of the component pressure of the other components. Changing the component mixing ratio will effect the characteristics of the product produced. Particularly, the density or hardness of foam produced in a polyurethane mixing system can be effectively altered by adjusting the nozzles for a single component during the course of a shot. This procedure enables production of multiple density pieces utilizing only a single mixing head. Previously, multiple density pieces require the use of multiple mixing heads, duplex mixing devices such as described in U.S. Pat. No. 4,175,874 or complicated mechanical hydraulic adjustments as shown in U.S. Pat. No. 4,378,335 the disclosure of which is incorporated herein.

By altering the setting pistons of the adjustable pumps or the pressure of both components the component flow rate or volume can be changed without effecting the mixing ratios. This a particularly useful feature when the cross-sectional area of the part in production varies. During production the mixing heads are normally carried on robot arms and moved over a mold at a constant speed during the course of a shot. Especially during the production of larger parts such as car seats it is important to pour more of the mixed components in the portion of a mold which defines a deeper area of the product than that which defines a shallower area. The apparatus according to the invention enables convenient computer controlled variation of shot volume per unit time and mixing ratio during the course of a single shot.

Closed loop control and supervision of parameters affecting good mixing such as temperature, pressure, and volume is required for good metering in an impingement mixing system. The mixing head support robotics carry the mixing heads over open molds at uniform travel speeds. The pressure control apparatus of the invention allows varying output rates during a shot and thus enables, in many cases, filling a mold with a varying depth with a single pass of a mixing head. By altering the component mixing ratios during a shot, compression hardness of the foam produced can be varied without utilizing two mixing heads or a duplex mixing head. By transferring this closed loop control method to mixing/metering machines with fixed mixing heads installed on closed molds allows the output rate to be matched to the mold profile or even to influence the flow pattern of the product within the mold. A further advantage of the nozzle adjustment apparatus is that foreign bodies which have collected on the nozzle needle may be released if the needles are lifted off so that the nozzles may establish a flush mode during the recirculation phase prior to production of a shot.

Automation in production processes is gaining increasing importance in polyurethane production. The present market place demands highly flexible production plants with the highest possible production rates resulting in a large number of moldings with a minimum number of rejects. According to the invention these objects can be maintained by utilizing a fully closed loop controlled metering machine. The primary variables or production parameters which can effectively be controlled by closed loop systems are temperature, volume, and pressure of the components.

Volume control has been to a certain extent possible by the utilization of variable rate component pumping units. Prior to the instant invention it has not been possible to suitably regulate the pressure of an impingement mixing plan. Prior to the invention pressure could only be set by manual adjustment of nozzles when the mixing heads was off-line. This, however, could not result in consistent pressure settings during the duration of a long production run. Interference factors such as varying material viscosities, nozzle needle wear and heat caused expansions of the needle have a direct influence on the processing pressure and over the course of a production run result in degraded product quality. In most cases pressure was only corrected when the article quality had dropped considerably and a large number of rejects were produced. A further disadvantage of fixed nozzles is the small range in which the output could varied without dropping the operating pressure below the minimum pressure necessary for mixing.

According to the invention the system pressure is monitored and regulated by a closed loop arrangement for adjusting the nozzle gap. Closed loop control of the pressure is achieved by adjusting the stroke of the nozzle needle and thus the width of the nozzle gap. The relationship between the nozzle gap and the setting stroke is given by the angle of the needle tip.

Altering the pressure in a closed loop system effects a change in volume and vice versa. In a polyurethane production plant the components must flow through various elastic hoses and pipelines between the pump and the mixing head. Compressibility of the hoses and components results in a lag between a command to effect a change in the production parameters and the actual occurrence of the change. Depending on the system a lag of up to two seconds is possible before a setting command takes its full effect. During steady state production of parts this lag does not have a significant affect because of the continuous monitoring and adjustment of the nozzles. The effects of this lag can easily be compensated for during production of multiple density or multiple output rate shots by a "look ahead" implementation of the computer controlled command sequence. In the computer controlled look ahead sequence the computer controller for regulating the mixing head shot simply anticipates the point at which the flow changes is required, thereby compensating for the characteristic delay contained in the production plant.

Advantageously, all of the open and closed loop control algorithms for the pressure regulation and volume controls may be arranged in a master computer. Additionally the position closed loop controls, specifically the flow and pressure controls may be arranged on separate position control cards so as to relieve this burden from the master computer. While control parameters such as needle position and pump pressure may be absolutely controlled and monitored this would require a tremendous expense for highly accurate components. Alternatively the machine may be set up with much simpler components and the system calibrated only when a mixing head nozzle or nozzle needle is replaced. Upon replacement of one of these components a learning process may be implemented to set the operational parameters of the system. This is required when actual value transducers or absolute sensors are not utilized. The learning process establishes the characteristic pattern of the mixing system by recording all pump setting-cylinder and nozzle needle positions with the pumps running. The results may advantageously be stored on a databank or diskette so that this operation need not be repeated each time the system is brought up.

According to the invention, the nozzle adjusting system allows consistent closed loop pressure control, independent of all interference factors, not subject to material or viscosity variations, and able to maintain constant pressures at variable throughput volumes.

Additional features and advantages of the invention will become apparent from a review of the drawings and the detailed description of the preferred embodiment below.

DETAILED DESCRIPTION OF THE PREFERRED EMBODIMENT

Figure 1:
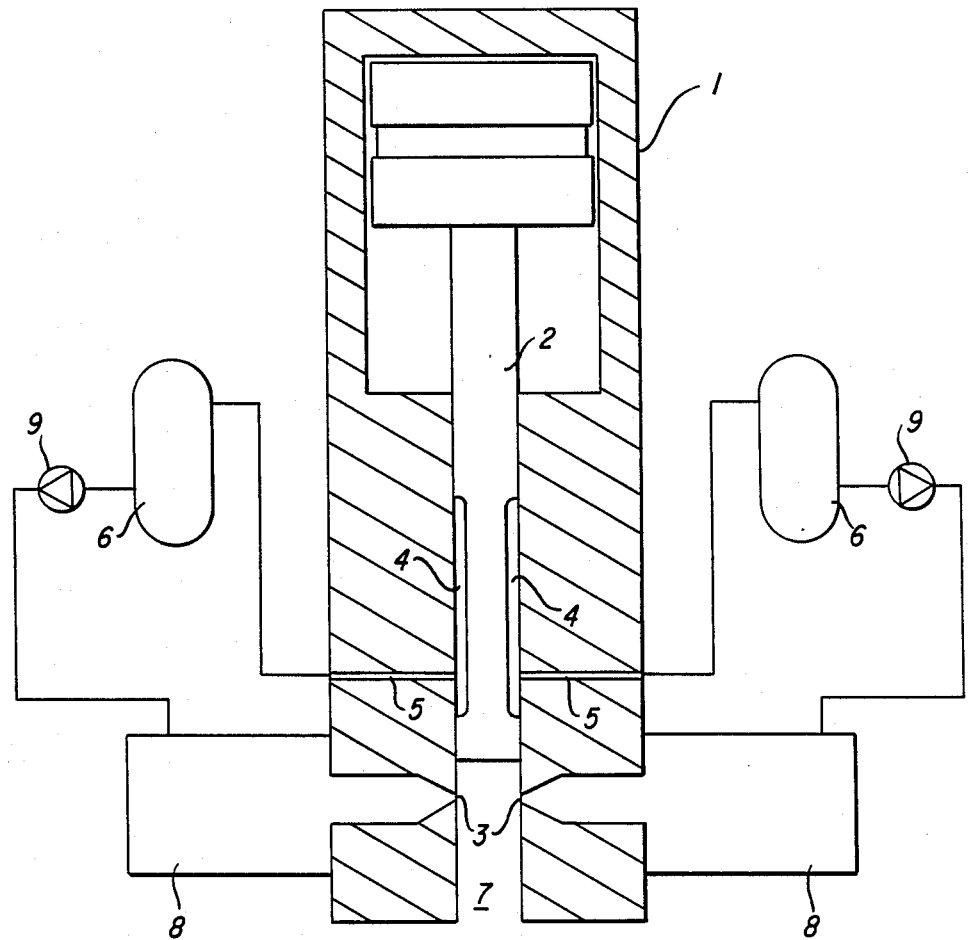
FIG. 1 illustrates a schematic rendition of a simple high pressure impingement mixing head with servo adjustable nozzle assemblies.

According to the invention an impingement mixing head such as those adapted for use in high pressure polyurethane impingement mixing may be advantageously arranged so that component pressure may be affected during a shot by a closed loop feedback apparatus in order to maintain appropriate impingement pressure, alter product characteristics by changing component ratios, and/or alter output rate of the impingement mixing device. FIG. 1 shows an impingement mixing head 1 which employs a hydraulically operated control piston 2. The control piston is shiftable between a first advanced position (not illustrated) where components recirculate from inlet ports 3 through recirculation grooves 4 and out component outlets 5 to reservoir tanks 6. An application for the contemplated impingement mixing heads may be high pressure impingement mixing of polyurethane. In the production of polyurethane at least two flowable components, polyol and isocyanate, must be intimately mixed in order to achieve a proper component reaction. Small amounts of unmixed components or off ratio mixtures often cause fatal defects in the final products.

The control piston 2 may be retracted into a second position whereby components are introduced into a mixing chamber 7 through the inlet ports 3. The components impinge upon each other in the mixing chamber 7 and flow out of the mixing head into a mold (not shown). The impingement mixing head is equipped with nozzle assembly 8 which includes servo adjustable nozzle needles. Pumps 9 transport the components from reservoir 6 through the circulation lines to the nozzle assembly. While FIG. 1 illustrates a simple straight mixing head the invention is in no way limited in application to such mixing heads. It is contemplated that this invention may be utilized with a diverse array of impingement mixing devices including but not limited to straight heads, L-shaped heads, and T-shaped heads.

Figure 2:
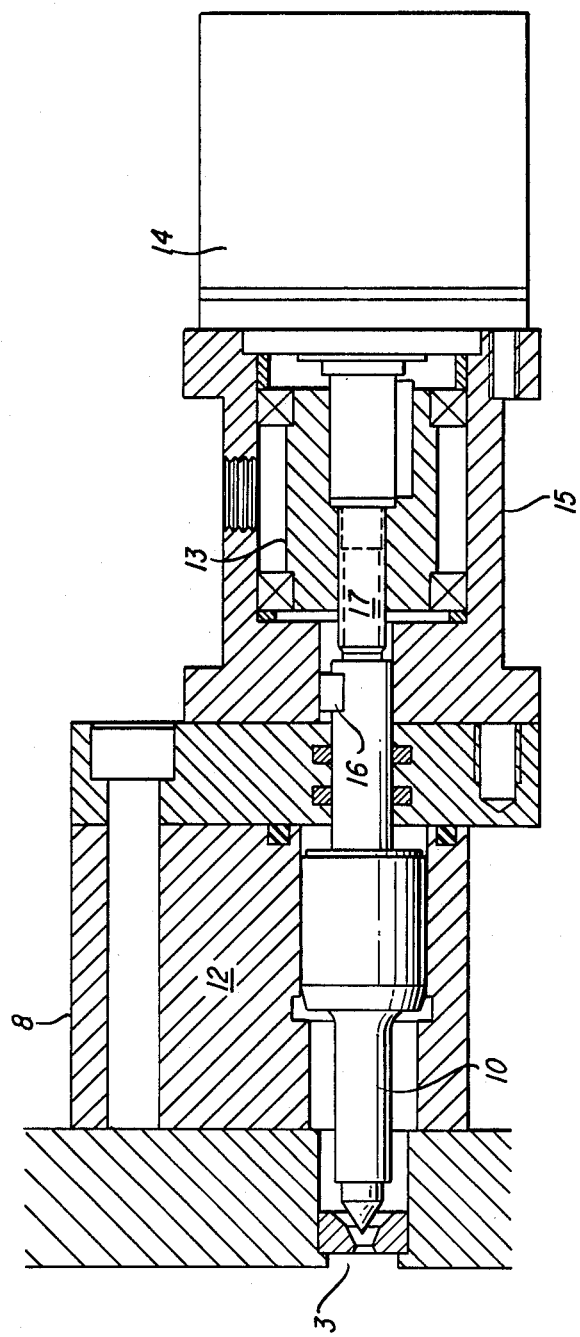
FIG. 2 shows a detailed view of the servo adjustable nozzle needle assembly.

FIG. 2 shows a detailed layout of a nozzle assembly with a servo adjustable nozzle needle. The layout shown in FIG. 2 allows fine adjustment of the axial position of the nozzle needle 10. The nozzle needle 10 is aligned with the component inlet 3 and defines a nozzle gap 11 through which the components are introduced. The nozzle needle 10 is arranged in a nozzle holder 12 which is attached to the body of the impingement mixing head. Component feed lines are advantageously connected to the nozzle holder. An adjusting spindle 13 is attached between the nozzle needle 10 and the servo drive motor 14. The adjusting spindle serves to translate the rotational motion of the servo drive motor to axial displacement of the nozzle needle 10.

The adjusting spindle 13 is arranged in a housing 15. The portion of the spindle connected to the nozzle needle is stabilized against rotation by a spline key 16 which allows only axial movement. The translation of rotation motion to axial displacement is accomplished by a threaded portion 17 of the adjusting spindle.

Figure 3:
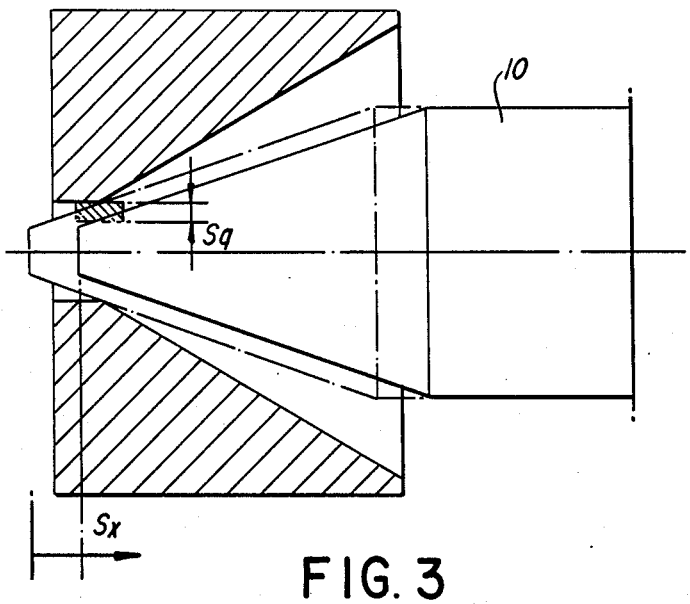
FIG. 3 illustrates a nozzle needle tip.
Figure 4:
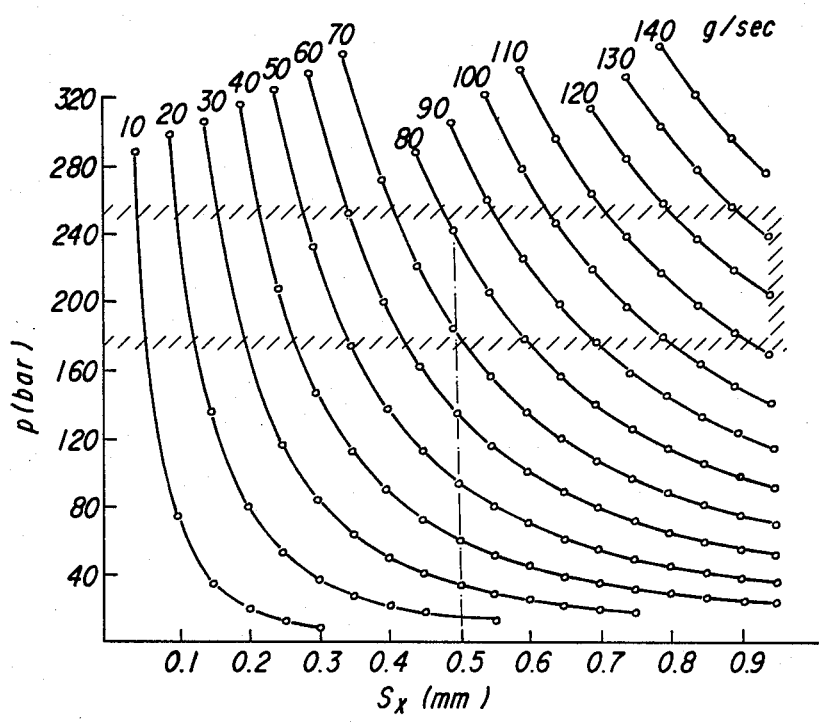
FIG. 4 illustrates the relationship between nozzle displacement and pressure at various component flow rates.

FIG. 3 shows an enlarged view of a nozzle needle 10, the close loop control of the pressure is regulated by setting the adjusting stoke $S_x$ and thus the width of the nozzle gap $b_s$. The relationship between the nozzle gap and a setting stroke is defined by the angle of the needle tip. A very pointed nozzle needle would be capable of very fine adjustments of the nozzle gap. Less pointed needles have a lower degree of adjustability but do allow for greater efficiency by reduced hydraulic friction losses. FIG. 4 shows a characteristic profile for a single needle. The horizontal axis $S_x$ represents the needle displacement and is correlated to the size of the nozzle gap. The vertical axis represents the nozzle pressure. The relationship between pressure and displacement is plotted at various output flow rates. A window is drawn in representing an exemplary range of nozzle pressures for an impingement process. If, for example, a pressure of 240 bar is desired with an 80 g per second output the appropriate nozzle displacement would be approximately 0.5 mm. Because pressure and volume are interrelated any change in pressure will lead to a difference in flow volume. The relationship between pressure and volume depends on the particular system configuration including the characteristics of the mixing head and nozzle assemblies. To enable computer regulated output and pressure control the mixing system should be calibrated prior to its use. This calibration procedure defines a data set which would enable the control computer to adjust pressure by varying the nozzle displacement and flow volume by setting an adjustable pump to establish a desired operating point.

Once the mixing system is calibrated and the characteristic pattern is stored various shot programs can be run without significant setting problems and at a very high accuracy of repeatability. The characteristic curve fields describe the behavior of the entire machine including feed pumps, the mixing head, and the nozzle needles. The characteristics can be established by completely opening, i.e., retracting the nozzle needles and stepping the range of pump output settings. At each pump output setting the pressure and flow rate is recorded. This process is repeated while progressively closing the nozzle gap for each nozzle setting. This procedure establishes a complete data set which the computer may subsequently utilize to control the pressure and output volume of the mixing apparatus to a desired setting.

The characteristic data set for the mixing system may be used during production to generate the desired setting for the nozzle displacement and pump adjustment in order to establish pressure and output rates. A particularly simple method in determining the appropriate settings for the desired parameters would be a simple iterative look-up process resulting in successive estimation of the appropriate settings. For example, if a predetermined pair of set values (pressure/flow rate) is to be attained the first step in the process would involve ascertaining the appropriate pump position for a particular flow rate assuming a completely open nozzle position. The second step would involve ascertaining the appropriate nozzle position for the desired pressure given the pump position ascertained in step 1. The third step entails ascertaining the appropriate pump position for the desired flow rate given the nozzle needle position ascertained in step 2. Finally, the pump position is ascertained for the corrected needle position found in step 3 based on the desired pressure. This process may be repeated until the pump position and needle position setting sufficiently converge to achieve an accurate result. In practice it has been found that this progression is strongly convergent and no more than two iterations are practically required.

Figure 7:
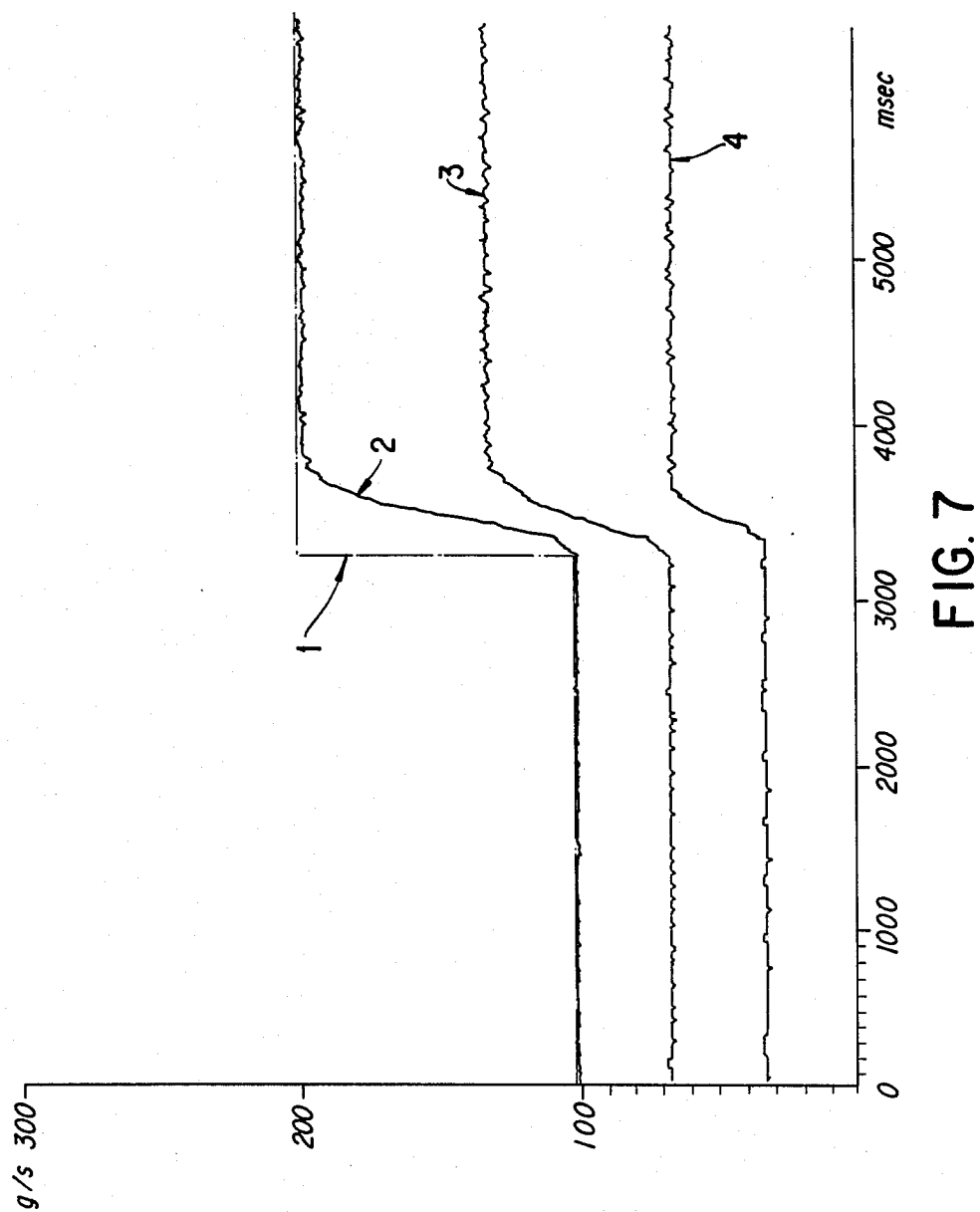
FIG. 7 illustrates a component run profile for an uncompensated component shot.
Figure 8:
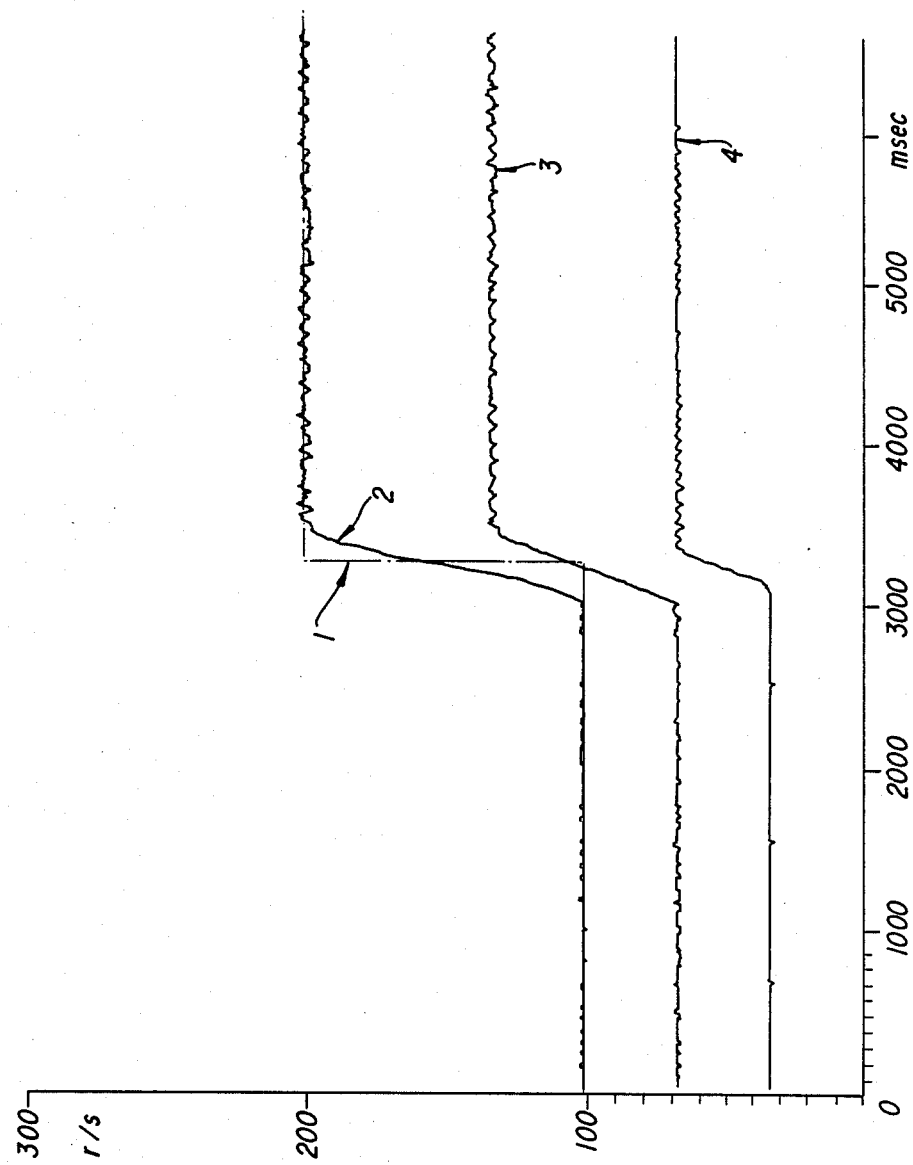
FIG. 8 illustrates a run profile for a component shot utilizing a look ahead lag compensation.

Because of the compressibility inherent in mixing systems there is a degree of lag associated with adjusting the pumps and nozzle positions. FIG. 7 shows a uncompensated run profile for a change in output rate for two components. Curve 1 shows the desired output rate. Curve 2 shows the output of both components utilized in an impingement mixing system. Curves 3 and 4 show the individual output rates of components A and B. It can clearly be seen that the actual output rate 2 lags measurably behind the desired component profile 1. FIG. 8 shows a run profile which is compensated by a look-ahead setting. The look-ahead serves to anticipate the desired output rate change by effectively commanding adjustment of the nozzle and/or pump a given period of time prior to the desired output change. FIG. 8 clearly demonstrates that the actual output rate shown in curve 2 more closely conforms to the desired output rate illustrated in curve 1.

Figure 5:
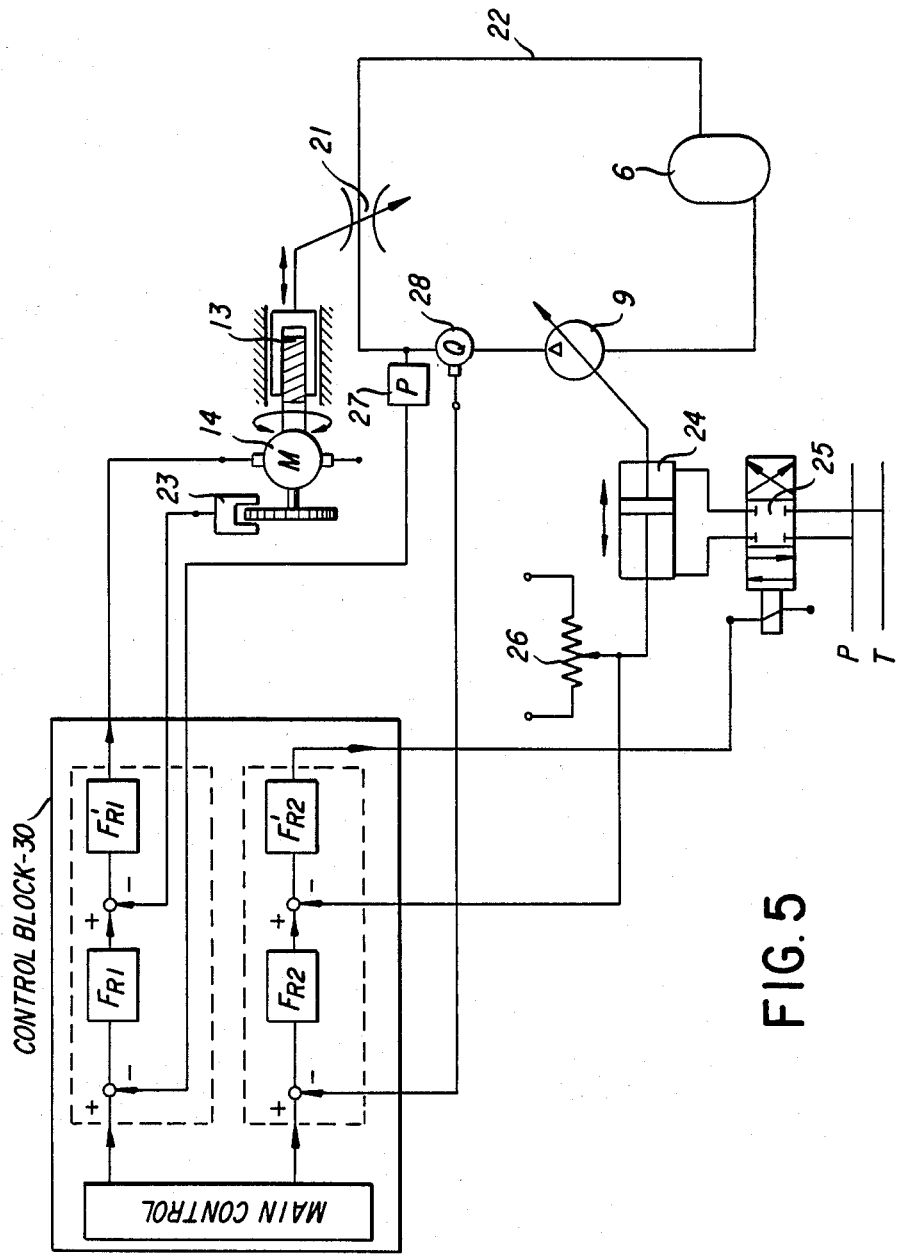
FIG. 5 illustrates a schematic physical layout of a closed loop parameter controlled impingement mixing apparatus.

FIG. 5 shows a system layout flow diagram for the control of a single component in an impingement mixing system. For the sake of simplicity, the second component control apparatus is not shown insofar as each component regulation layout is identical. The mixing head is illustrated as a controlled valve 21. The component flows in circulation loop 22 from the reservoir 6 through an adjustable pump 9 and into the mixing head 21. In the recirculation mode the component then returns from the mixing head 21 to the reservoir 6. In the pouring mode the component would be mixed and flow out of the mixing head into a mold. The threaded adjusting spindle 13 serves to control the variable control valve 21/mixing head 1. The spindle is driven by a servo drive motor 14. An incremental transmitter 23 is advantageously connected to the servo-motor 14 for reading the motor rotation which corresponds to the nozzle position. The incremental transmitter 23 may advantageously be composed of a electromagnetic pick-up which detects rotation of a disk associated with said servo-motor.

The adjustable pump 9 can be adjusted utilizing a setting piston 24. Movement of the setting piston affects a change in flow rate through the pump 9. The setting piston is controlled by a servo valve 25 supplied by lines P and T. The position of the setting piston is monitored by a linear potentiometer 26. The setting piston may advantageously be coupled to an output tap of the potentiometer 26. The pump position can thereby be read from the output value of the potentiometer.

A pressure transducer 27 to monitor pressure is advantageously connected to circulation loop 22 between the adjustable pump 9 and the mixing head 21. A flow meter 28 is also connected in the circulation loop prior to the mixing head. The control block 30 is connected in a closed loop. The control block monitors the pressure transducer 27 and the incremental transmitter 23 in order to actuate the servo-motor 14 to control the nozzle position. In a similar fashion the control block also monitors flow meter 28 and the linear potentiometer 26 in order to actuate the servo valve 25 to adjust the setting piston 24 thereby setting the pump 9.

The instantaneous feed volume is measured by the flow meter 4. The value measured in this manner is advantageously compared with a set value. The control block determines a deviation from the set value and therefrom a corrected position value for the pump control devices is ascertained. The corrected position value is entered into a subordinate position control circuit as a new set value. The subordinate position control circuit utilizes the linear potentiometer 26 to measure the instantaneous position of setting piston or cylinder 24 and compares that to a set value. Consistent with the control deviation a setting signal is issued to the servo valve 25 so that the setting piston 24 is displaced in the appropriate direction thereby adjusting the flow volume through pump 9.

The pressure transducer 27 can advantageously serve as an actual value sensor. Similar to the mask control circuit, here again the control deviation is measured and a new set value for the position of the nozzle needle is determined in the control block 30. The instantaneous position of the nozzle needle measured by the incremental transmitter 23 is utilized in order to ascertain an appropriate setting signal to correct the deviation. The control block issues a signal to the servo-motor 14 which affects a displacement of the nozzle needle via the adjusting spindle 13 thereby altering the nozzle spray pressure.

Figure 6:
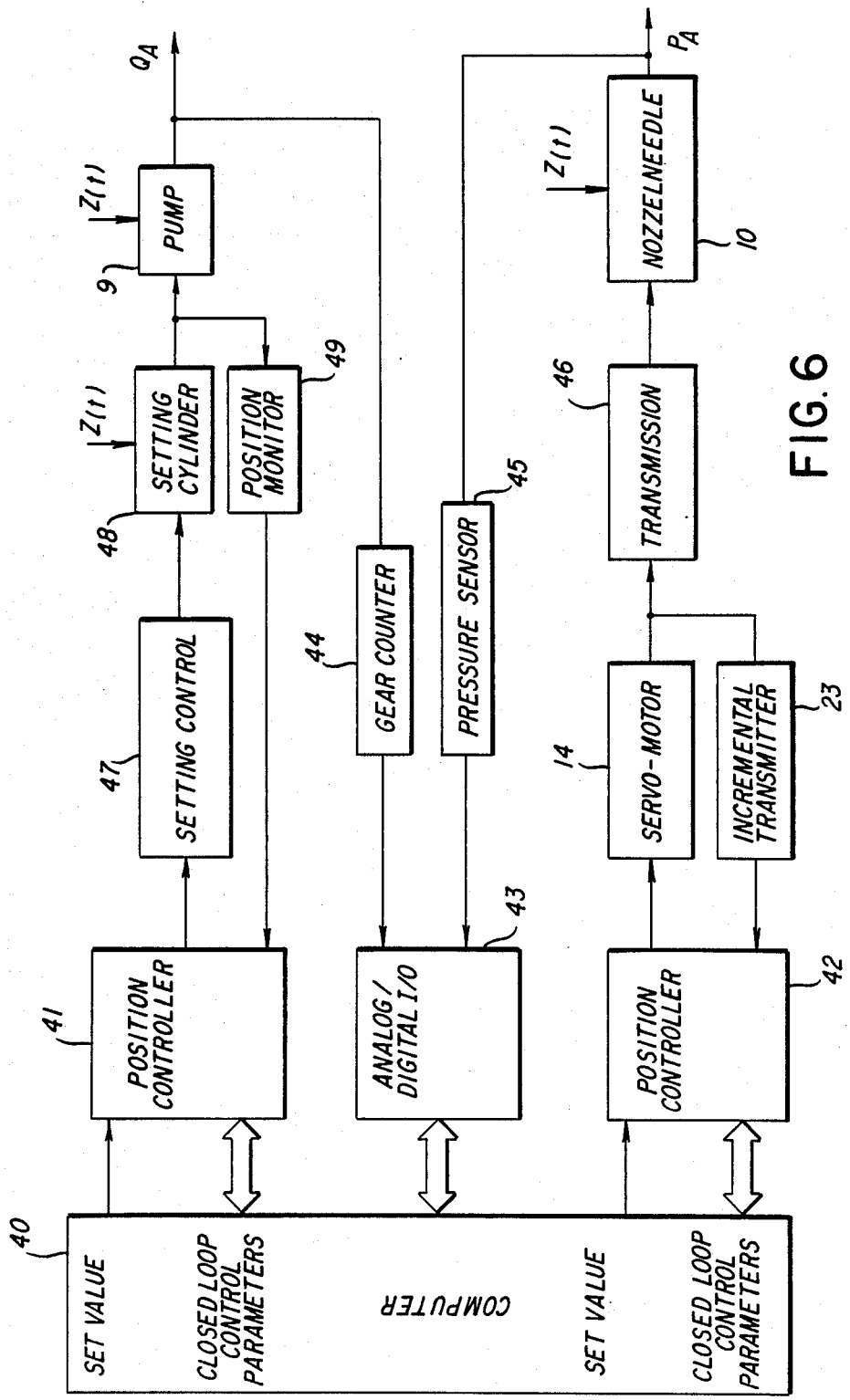
FIG. 6 illustrates a conceptional block diagram of a closed loop parameter control apparatus.

FIG. 6 shows a schematic block diagram of the adjustments system illustrated in FIG. 5. The control block is implemented in a control computer 40 with associated independent position controllers 41 and 42 for the pump and nozzle needle adjustments respectively. An input/output (I/O) block 43 receives the output signals from the incremental transmitter 23 represented as a gear counter 44 and the pressure transducer 27 represented as a pressure sensor 45. The servo-motor 14 is responsive to the position controller 42. The incremental transmitter is coupled to the servo-motor 14 and provides an output to the position controller 42 representative of the position of the servo-motor. The servo-motor is also connected to a transmission block 46 which corresponds, in the preferred embodiment, to the adjusting spindle 13. The adjusting spindle is coupled to the needle 10. The controlled parameter pressure is represented by the output $P_a$ (pressure of component A). The output pressure $P_a$ is monitored by pressure sensor 45 whose output is connected to the computer 40 through the I/O block 43.

The position controller 41 for adjusting the pump 9 is connected in a similar fashion. The position controller 41 is connected to a setting control 47. This setting control corresponds to the servo valve 25 illustrated in FIG. 5. The setting control is connected to a pump setting cylinder 48 corresponding to the setting piston 24 illustrated in FIG. 5. The setting cylinder 48 is connected to the adjustable pump 9. The setting cylinder is also connected to a position monitor 49 which corresponds to the linear potentiometer 26. The primary output of the setting pump is flow rate represented by output $Q_a$ (flow rate of component A). This flow rate is detected by a gear counter 44 which corresponds to flow meter 28 illustrated in FIG. 5. Gear counter 44 is connected to computer 40 through I/O block 43. FIG. 6 also illustrates the most significant sources of interference variables in the control system. These interference variables are represented by input $Z_t$ and most significantly will occur at the setting cylinder 48, the pump 9, and nozzle needles 10.

Described herein is a example of the preferred embodiment of the invention. Those of ordinary skill in art will comprehend that many modifications are possible without departing from the spirit and scope of the invention. The embodiment described above is not intended to limit the scope of protection defined by the claims.

I claim:

1. An impingement mixing apparatus comprising:
   an impingement mixing head for mixing at least two components;
   a circulation loop feed branch leading from a component reservoir to a input port of said mixing head and a circulation loop return branch from a recirculation port of said mixing head to said component reservoir;
   a component pump arranged in said circulation loop;
   a closed feedback loop means for adjusting impingement pressure including means for monitoring pressure connected to said circulation loop, control means for evaluating monitored pressure responsive to said means for monitoring, and means for changing a cross-section of said circulation loop feed branch connected to said circulation loop and responsive to said control means.

2. An impingement mixing apparatus according to claim 1, wherein said means for changing comprises:
   an adjustable nozzle needle arranged in an input port of said mixing head; and
   means for axially displacing said adjustable nozzle needle connected to said nozzle needle.

3. An impingement mixing apparatus according to claim 2, wherein said input port exhibits a conical configuration and said nozzle needle exhibits a corresponding conical configuration.

4. An impingement mixing apparatus according to Claim 2, wherein said means for axially displacing comprises:
   a servo drive motor connected to said impingement mixing head; and
   an adjusting spindle means coupling said servo drive motor to said adjustable nozzle needle for translating rotational motion of said servo drive motor to axial motion of said nozzle needle.

5. An impingement mixing apparatus according to Claim 4, wherein said means for adjusting impingement pressure further comprises means for altering component output rates by adjusting impingement pressure of a single component wherein said control means is capable of affecting displacement of said nozzle needle at a predetermined point in a component shot; and
   transmitter means connected to said servo drive motor for indicating incremental motion of said servo drive motor to said control means.

6. An impingement mixing apparatus according to Claim 4, further comprising:

a second closed feedback loop means for adjusting component flow volume connected to said circulation loop.

7. An impingement mixing apparatus according to claim 6, wherein said second closed feedback loop means comprises:
a flow meter arranged in said circulation loop;
means for adjusting flow volume through said circulation pump connected to said circulation pump; and
means for controlling adjustment of said circulation pump connected to said flow meter and said means for adjusting flow volume.

* * * * *